United States Patent [19]
Nishimura et al.

[11] 4,041,219
[45] Aug. 9, 1977

[54] SILVER PEROXIDE-ZINC BATTERY

[75] Inventors: Hajime Nishimura, Tokyo; Yasushi Nomura, Tokorozawa, both of Japan

[73] Assignee: Citizen Watch Company Limited, Tokyo, Japan

[21] Appl. No.: 664,075

[22] Filed: Mar. 5, 1976

[30] Foreign Application Priority Data

Dec. 12, 1975 Japan .............................. 50-148294

[51] Int. Cl.$^2$ ............................................ H01M 10/32
[52] U.S. Cl. .................................... 429/144; 429/206; 429/190; 429/219; 429/229
[58] Field of Search ..................... 136/20, 111, 30, 24, 136/28, 120 R; 429/219, 229, 190, 206, 144, 249, 162

[56] References Cited

U.S. PATENT DOCUMENTS

| | | | |
|---|---|---|---|
| 2,811,572 | 10/1957 | Fischbach et al. | 136/20 X |
| 2,902,530 | 9/1959 | Eisen | 136/20 |
| 3,520,729 | 7/1970 | Voss et al. | 136/20 |
| 3,880,672 | 4/1975 | Megahed et al. | 136/111 |

Primary Examiner—Anthony Skapars

[57] ABSTRACT

A silver peroxide-zinc battery having a positive active material composed of silver peroxide, a negative active material composed of zinc, and an electrolyte comprising an aqueous alkaline hydroxide solution, in which an oxide of manganese is added to the silver peroxide.

11 Claims, 7 Drawing Figures

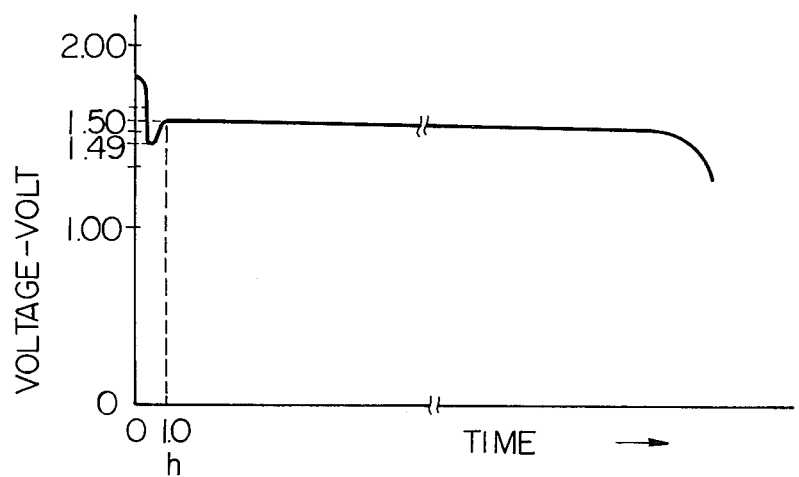
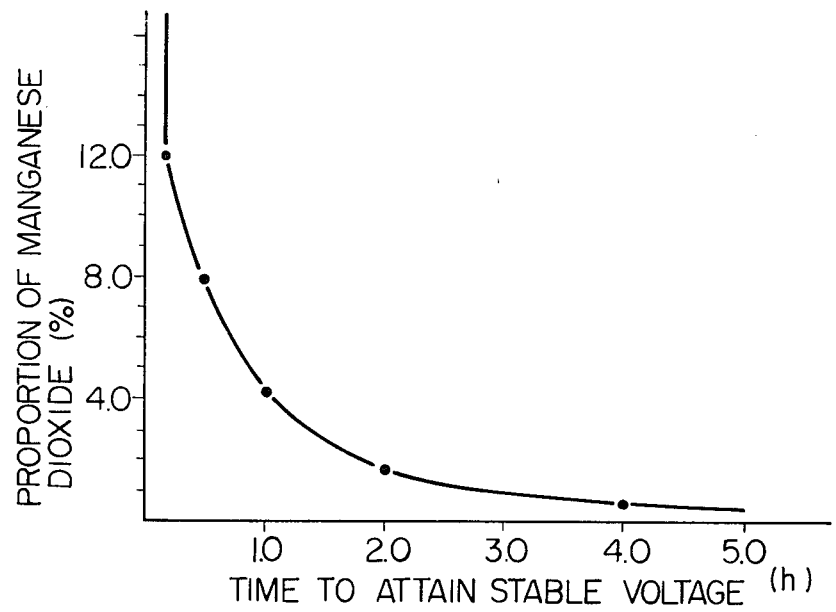

SILVER PEROXIDE-ZINC BATTERY

This invention relates to a silver peroxide-zinc battery and, more particularly, to an improvement over such a battery.

Generally, a silver peroxide-zinc battery using silver peroxide as a positive active material, zinc as a negative active material, and an aqueous alkaline hydroxide solution as an electrolyte undergoes the following electrode reactions:

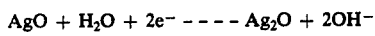

$$AgO + H_2O + 2e^- \longrightarrow Ag_2O + 2OH^-$$

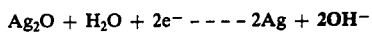

$$Ag_2O + H_2O + 2e^- \longrightarrow 2Ag + 2OH^-$$

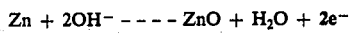

$$Zn + 2OH^- \longrightarrow ZnO + H_2O + 2e^-$$

The silver peroxide-zinc battery has a current capacity of 3.22 Ah per unit volume (cc), approximately twice as high as the value of 1.67 AH/cc for a monovalent silver oxide-zinc battery. In other words, the silver peroxide-zinc battery has about 1.5 times the capacity of the monovalent silver oxide-zinc battery having an equal size. Thus, the silver peroxide-zinc cell has a significantly higher capacity than the monovalent silver oxide cell. However, its discharge characteristic is characterized by two distinct potentials, such that after a comparatively long period of discharges, an initial output level of 1.8 volts drop to a stable level of 1.5 volts. This period amounts to for about 30 percent of the total discharge life. Thus, such a silver peroxide-zinc cell may not be suitable as a power source for particular application such as some electronic devices, because of its unstable discharge characteristics. If it were used as a 1.8-volt power source, the voltage would drop after a fairly short time to a level of 1.5 volts. If, on the other hand, it were used as a 1.5-volt power source, the cell would have to be discharged wastefully until the voltage dropped to a stable potential of about 1.5 volts, resulting in an increase in processing time after manufacture and causing a great loss of cell capacity.

It is therefore an object of the present invention to provide a new and improved silver peroxide-zinc battery having a significantly higher capacity per unit weight and volume than a prior art battery.

It is another object of the present invention to provide a new and improved silver peroxide-zinc battery characterized by a single discharge potential over a remarkably long period.

It is another object of the present invention to provide a silver peroxide-zinc battery which begins to discharge at a stable constant potential before its capacity has been appreciably decreased.

It is another object of the present invention to provide a silver peroxide-zinc battery which although of miniaturized size provides a constant discharge potential over a significantly increased time period.

It is still another object of the present invention to provide a silver peroxide-zinc battery which is simple in construction and easy to manufacture.

It is a further object of the present invention to provide a silver peroxide-zinc battery which is suitable for various applications.

These and other objects, features and advantages of the present invention will become more apparent from the following description when taken in conjunction with the accompanying drawings, in which:

FIG. 4 is a curve showing the discharge characteristics of the silver peroxide battery shown in FIG. 3;

FIG. 5 is a graph illustrating the relationship between the proportion of manganese oxide added to the positive active material and the time at which the battery begins to discharge at stable potential;

Figure 1:
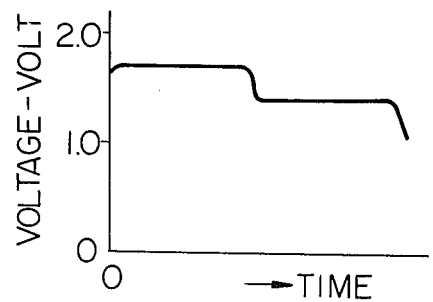
FIG. 1 is a curve showing the discharge characteristics of a conventional silver peroxide-zinc battery.

As already discussed, a conventional silver peroxide-zinc battery discharges at two distinct potentials as shown in FIG. 1 and, for this reason, has various shortcomings as described hereinabove. To solve this problem, it has been proposed to provide an improved electrode comprising two different materials which will utilize the properties of monovalent silver oxide and the properties of silver peroxide as disclosed in U.S. Pat. No. 3,655,450 entitled "Battery Electrode and Method of Making the Same" by Luis A. SotoKrebs, which is shown in FIG. 2.

Figure 2:
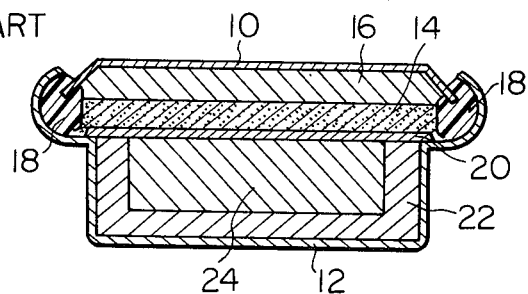
FIG. 2 is a cross sectional view of a prior art silver peroxide-zinc battery.

The conventional silver-zinc primary cell of FIG. 2 has a composite positive silver oxide electrode. The cell comprises a cell cap 10, a cell cup 12, an alkaline hydroxide absorbing layer 14, a zinc negative electrode 16, a gasket seal 18, a separator 20, a monovalent silver oxide 22, and a silver peroxide 24. The cell is characterized by a composite positive electrode of two-layer construction comprising a layer of silver peroxide and another layer of monovalent silver oxide and containing lead dioxide as a component of the composite positive electrode.

For experimental purposes, a cell 11.6 mm. in diameter and 5.4 mm. thick was prepared in accordance with the description of said U.S. Pat. No. 3,655,450. The cell had a weight ratio of silver peroxide to monovalent silver oxide of 1:1, and contained 4% lead dioxide with respect to the weight of the silver peroxide active material. Test revealed that at normal temperature and connected to a 5-K-ohm load, the initial voltage of about 1.8 v dropped to 1.55 v after about 19 hrs. of discharge. The cell of U.S. Pat. No. 3,655,450 thus can be put to practical use, but there are difficulties in the following points:

1. Production of a two-layered positive electrode is a labor-intensive procedure; and 2. A decreased content of silver peroxide also decreases the cell capacity, which thereby comes close to the capacity of monovalent silver oxide-zinc cells.

The present invention contemplates the provision of a silver peroxide-zinc cell, wherein the feature of high cell capacity of a silver peroxide is retained, while solving the problem of initial higher discharge potential. In accordance with an essential feature of the present invention, the positive electrode comprises silver peroxide and a proportion of an oxide of manganese as a positive electrode active material. It is preferred that the oxide of manganese content of the positive active material is selected within a range from about 0.3 to about 10% by weight.

Figure 3:
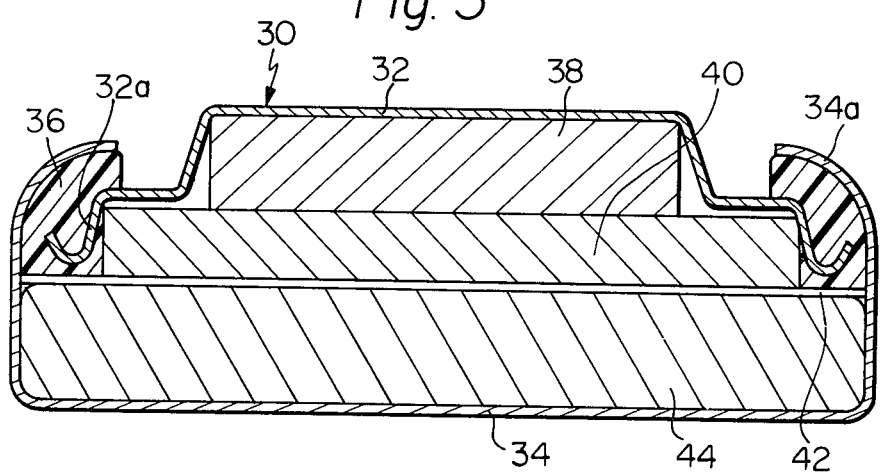
FIG. 3 is a cross sectional view of a preferred embodiment of a silver peroxide-zinc battery according to the present invention.

FIG. 3 shows in cross section a silver peroxide-zinc battery embodying the present invention. As shown, the battery 30 has a two part container comprising an upper section or cap 32 which houses the negative electrode, and a lower section or cup 34 which houses the positive electrode. As shown, the bottom cup 34 has an annular shoulder or flange 34a which is crimped inward during assembly to seal the battery 30. The bottom cup 34 may be made of nickel plated steel, and the cap 32 may be made of tin plated stainless steel. The cap 32 is insulated from the bottom cup 34 by means of a grommet 36 which is compressed between an annular flange 32a of the cap 32 and the flange 34a of the bottom cup 34 during the crimping operation of battery assembly to provide a compression seal between these parts. The grommet 36 may be made of a suitable resilient electrolyte-resistant material such as neoprene.

The negative electrode of the battery 30 comprises a layer 38 of zinc. The zinc electrode 38 is separated from the positive electrode by means of an electrolyte-absorbent layer 40 impregnated with a potassium hydroxide solution, and a membrane barrier 42. The electrolyte-absorbent layer 40 may be made of electrolyte-resistant material. The barrier layer 42 may be a semi-permeable material such as cellophane, or comprise a suitable organic carrier such as polyethylene.

The positive electrode of the battery 30 comprises, in accordance with the present invention, a layer 44 of active material comprising a mixture of a silver peroxide and an oxide of manganese such as manganese dioxide, manganese oxide (MnO), manganese trioxide ($Mn_2O_3$), and trimanganese tetroxide ($Mn_3O_4$). More specifically, a very small proportion of an oxide of manganese is added to the silver peroxide so that significantly more silver peroxide can be included in the electrode, thereby increasing the capacity of the cell by comparison with a cell of the prior art.

In accordance with the present invention, a silver peroxide-zinc cell 11.6 mm in diameter and 5.4 mm thick was prepared using as the positive electrode a 96:4 mixture of silver peroxide and manganese dioxide. FIG. 4 shows a discharge characteristic of this cell obtained with a load of 5 k-ohms. The initial voltage of 1.8 v cell fell to 1.5 v or less within 30 to 40 minutes, and the cell output became stabilized at 1.5 v within an hour.

Tests were run with cells of this invention having same size but with varying proportions of silver peroxide to manganese dioxide. Test results are given in Table 1, below.

Table 1

| No. of samples | Mixing proportions of positive electrode materials | | Time required to stabilize output voltage at 1.55 v with a 5-Kohm load |
|---|---|---|---|
| | AgO (%) | $MnO_2$ (%) | |
| No. 1 | 99.7 | 0.3 | 50.0 hr. |
| No. 2 | 99.5 | 0.5 | 5.0 hr. |
| No. 3 | 99 | 1 | 4.0 hr. |
| No. 4 | 98 | 2 | 2.0 hr. |
| No. 5 | 96 | 4 | 1.0 hr. |
| No. 6 | 92 | 8 | 0.5 hr. |
| No. 7 | 88 | 12 | 0.3 hr. |
| No. 8 | 84 | 16 | 0.3 hr. |

Based on the results given in Table 1, the proportions of manganese dioxide $MnO_2$ added were plotted in FIG. 5 against the time required to stabilize the output voltage.

In addition to manganese dioxide, other manganese oxides, such as manganese oxide MnO, manganese trioxide $Mn_2O_3$, and trimanganese tetroxide $Mn_3O_4$, were also used as a component of positive electrode active materials to obtain similar test results. These are given in Table 2, below.

Table 2

| Types of Manganese oxides | No. of samples | Mixing ratios of positive electrode materials | | Time required to stabilize voltage 1.5 v with a 5-kohm load |
|---|---|---|---|---|
| | | AgO | Manganese oxides | |
| MnO | No. 9 | 99% | 1% | 3 hr. |
| | No. 10 | 96% | 4% | 0.5 hr. |
| | No. 11 | 92% | 8% | 0.5 hr. |
| $Mn_2O_3$ | No. 12 | 99% | 1% | 5 hr. |
| | No. 13 | 96% | 4% | 1.0 hr. |
| | No. 14 | 92% | 8% | 0.5 hr. |
| $Mn_3O_4$ | No. 15 | 99% | 1% | 6 hr. |
| | No. 16 | 96% | 4% | 1.5 hr. |
| | No. 17 | 92% | 8% | 1.0 hr. |

As obvious from the above results, the silver peroxide-zinc cell of this invention gives the following advantages:

1. The period of discharge at an initial high voltage level can be shortened considerably. This initial period is so short that it would create no problem in practical use.

2. The cell of this invention eliminates the necessity of forming a composite positive electrode of two-layer construction, thus making production steps shorter and production easier.

3. Because a comparatively small proportion of an oxide of manganese is added, the use of silver peroxide enables a cell having a discharge capacity of 3.22 AH/cc to be constructed. Thus, the production of small-size high capacity cells is made possible.

Hitherto mercury cells, which can have a capacity as high as 2.76 AH/cc have been receiving consideration. However, fears have recently been expressed that mercury may cause environmental hazards, so that its production and use have become more and more difficult. Another conventional type of cell, which uses monovalent silver oxide and zinc has the problem of low capacity. Thus the cell of this invention has many practical advantages.

One embodiment of this invention is a silver peroxide-zinc cell 11.56 mm in diameter and 2 mm thick. This cell has a current capacity of 48 mAH, higher than the minimum level of 40 mAH required for use in wrist watches.

Figure 6:
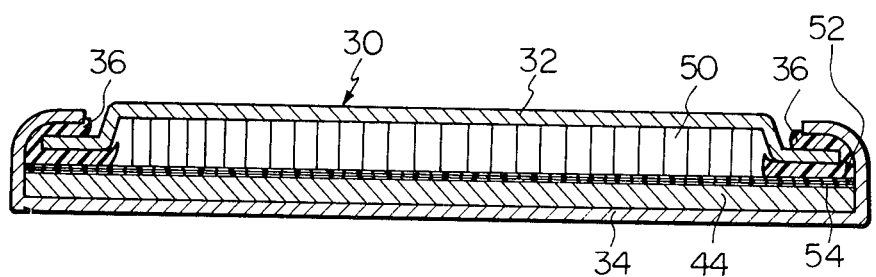
FIG. 6 is a cross sectional view of another preferred embodiment of the battery according to the present invention.
Figure 7:
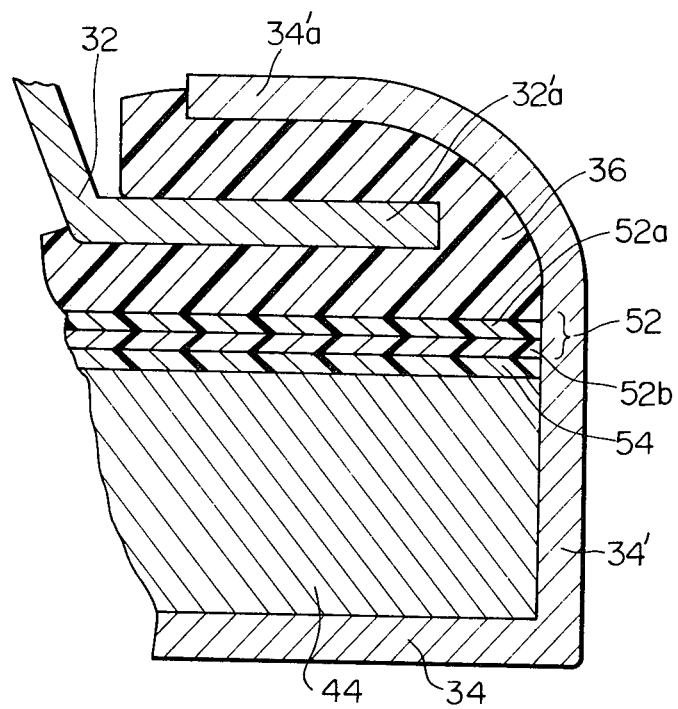
FIG. 7 is a fragmentary enlarged cross-sectional view of a part of the battery shown in FIG. 6.

FIG. 6 shows another preferred embodiment of this invention, wherein the same numbers as used in FIG. 3 represent the same structural parts. In this embodiment, the negative electrode does not consist of two layers of a negative electrode active material and an electrolyte-absorbent layer 40, as in FIG. 3, but instead, a single layer 50 of an electrolyte in the form of a gel and incorporating zinc powder therein. FIG. 7 shows a fragmentary enlarged cross-sectional view of the cell illustrated in FIG. 6. As seen in FIG. 7, a separator or membrene barrier 52 includes two resin film layers 52a and 52b. In this preferred embodiment, the layer 52a consists of polyvinyl alcohol, which serves to prevent silver hydroxide formed by a part of the silver peroxide reacted with the alkaline hydroxide electrolyte from dissolving into the layer 50 of negative electrode such that reaction between the silver hydroxide and the zinc is avoided. The layer 52b comprises a polypropylene film, which prevents the polyvinyl alcohol layer from making direct contact with the positive active material. If polyvinyl alcohol comes in contact with the silver peroxide, the latter is reduced to monovalent silver oxide, thereby causing the polyvinyl alcohol layer to become coated with particles of monovalent silver oxide.

Various combinations of multiple layers other than polyvinyl alcohol and polypropylene may be conceived for use as the separator of this invention, to provide the best characteristics for the respective resin films.

If the separator according to this invention is used in other types of cells, combinations of multiple resin films can be employed for the separator which is suitable with regard to the characteristics of the negative and positive electrodes.

The layer 54 is a film or layer impregnated with the electrolyte solution. It is located on the positive electrode side of the separator, and its function is to allow the electrolyte to permeate uniformly through the separator into the positive active material, thereby shortening the period of cell aging normally necessary after manufacture, to assure the cell quality. In tests, this electrolyte-impregnated layer 54 make it possible to shorten the aging period from the usual 2 months to only a week and provide good low-temperature characteristics.

In order to provide a cell as thin as 2 mm, the structure is such that the side wall 34' of the cell container has a flange 34'a, which is crimped inward to hold an annular flange 32'a of the cap 32 between the flange 34'a and the positive electrode 44, and that the cap periphery 32'a and the flange 34'a are arranged in parallel to the bottom 34 cup.

The silver-zinc cell produced according to this invention will greatly contribute to the manufacture of thin type wrist watches. As another embodiment of this invention, a cell 15.4 mm in diameter and 4.8 mm thick, having a discharge capacity of 300 mAH, was produced. The latter type of cell will find applications such as use in wrist watches which consume relatively large amounts of power and in electric calculators, permitting them to have additional functions.

Although potassium hydroxide is used in the preferred embodiments of this invention, it is used merely for the purpose of providing good low-temperature characteristics, which are required when the cell is used in wrist watches. It is to be understood, therefore, that alkaline hydroxides employed according to this invention are not limited to potassium hydroxide, but that sodium hydroxide may be used for specific purposes within the scope of this invention. Furthermore, an aqueous solution of a mixture of sodium and potassium hydroxides may be used to give better conductivity and permeability of either material.

It is also to be understood that not only a primary cell but also a secondary cell including silver peroxide and zinc provides similar advantages as described hereinabove, by using a composite positive electrode containing silver peroxide and an oxide of manganese.

What is claimed is:

1. A silver peroxide-zinc battery comprising a positive active material, zinc as a negative active material, and an electrolyte, said positive active material consisting essentially of silver peroxide and a proportion of an oxide of manganese.

2. A battery according to claim 1, in which the oxide of manganese content of said positive active material is from about 0.3 to about 10% by weight.

3. A battery according to claim 1, in which said oxide of manganese is a manganese dioxide.

4. A battery according to claim 1, in which said electrolyte comprises an aqueous alkaline hydroxide solution.

5. A battery according to claim 1, in which said electrolyte comprises a mixture of an aqueous solution of potassium- and sodium hydroxides.

6. A battery according to claim 4, in which said negative active material is gelled with said alkaline hydroxide solution to form a single layer.

7. A battery according to claim 1, further comprising barrier means disposed between said negative active material and said positive active material.

8. A battery according to claim 7, in which said barrier means comprises a first layer of polyvinyl alcohol, and a second layer of polypropylene.

9. A battery according to claim 8, in which said barrier means further comprises a third layer impregnated with an electrolyte solution, said third layer being disposed in contact with said positive active material.

10. A battery according to claim 1, further comprising a cap housing said negative active material, and a bottom cup housing said positive active material, said cap and said bottom cup having annular flanges arranged in parallel relationship, and said annular flange of said bottom cup being crimped inward during assembly to seal the battery.

11. A battery according to claim 3, wherein said manganese dioxide content is from 0.3% to about 8% by weight.

* * * * *